United States Patent [19]
Foulds et al.

[11] 3,966,550
[45] June 29, 1976

[54] REACTOR FUEL ASSEMBLIES

[75] Inventors: Ronald B. Foulds; Alvin H. Kasberg, both of Murrysville; Karl H. Puechl, Export; Melvin L. Bleiberg, Pittsburgh, all of Pa.

[73] Assignee: Atlantic Richfield Company, Los Angeles, Calif.

[22] Filed: Feb. 26, 1973

[21] Appl. No.: 335,998

Related U.S. Application Data

[63] Continuation of Ser. No. 125,544, March 18, 1971, abandoned.

[52] U.S. Cl. ................................................. 176/78
[51] Int. Cl.² ......................................... G21C 3/18
[58] Field of Search ................................ 176/76, 78

[56] References Cited
UNITED STATES PATENTS

| | | | |
|---|---|---|---|
| 3,350,275 | 10/1967 | Venier et al. | 176/76 |
| 3,431,171 | 3/1969 | Glandin | 176/76 |
| 3,442,763 | 5/1969 | Chetter et al. | 176/76 |
| 3,457,140 | 7/1969 | Glandin | 176/78 |
| 3,510,397 | 5/1970 | Zettervall | 176/78 |
| 3,772,148 | 11/1973 | Seddon | 176/78 |

FOREIGN PATENTS OR APPLICATIONS

| 1,514,559 | 6/1969 | Germany | 176/78 |
|---|---|---|---|

*Primary Examiner*—Harvey E. Behrend
*Attorney, Agent, or Firm*—John R. Ewbank

[57] ABSTRACT

An improved spacer grid for a nuclear fuel assembly comprising fuel rods in a matrix wherein each rod is adapted to be enclosed by a spacer "cell" for positioning thereof relative to adjacent rods in the fuel assembly.

7 Claims, 12 Drawing Figures

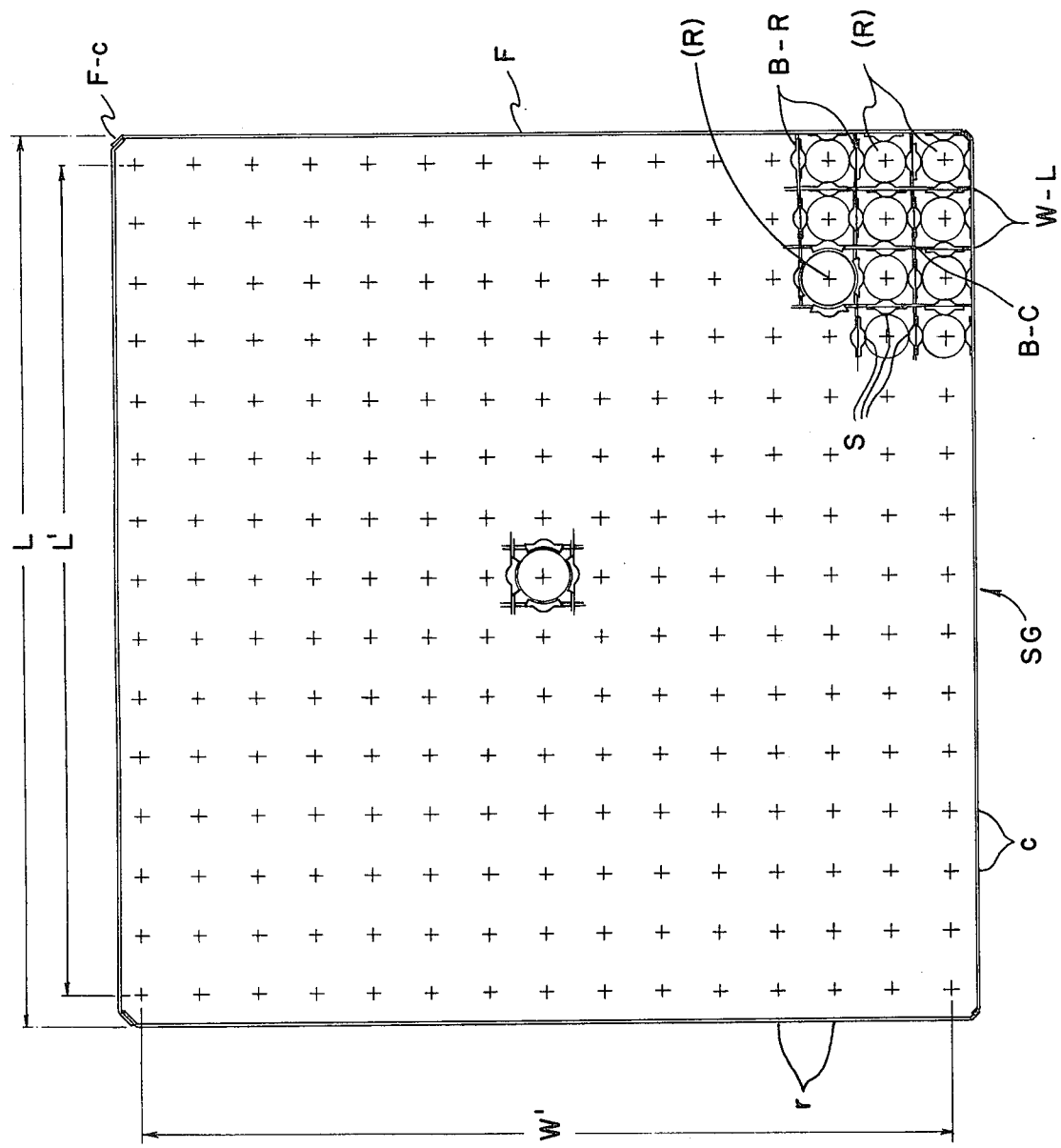

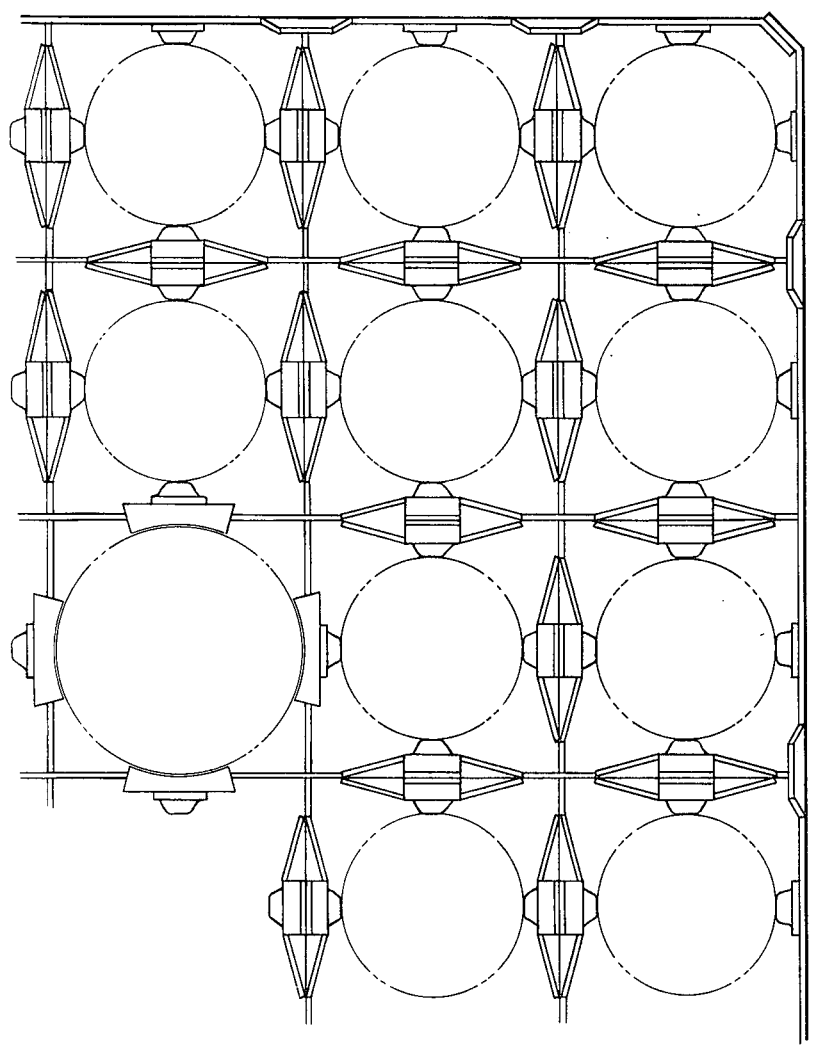
FIG. 1-B

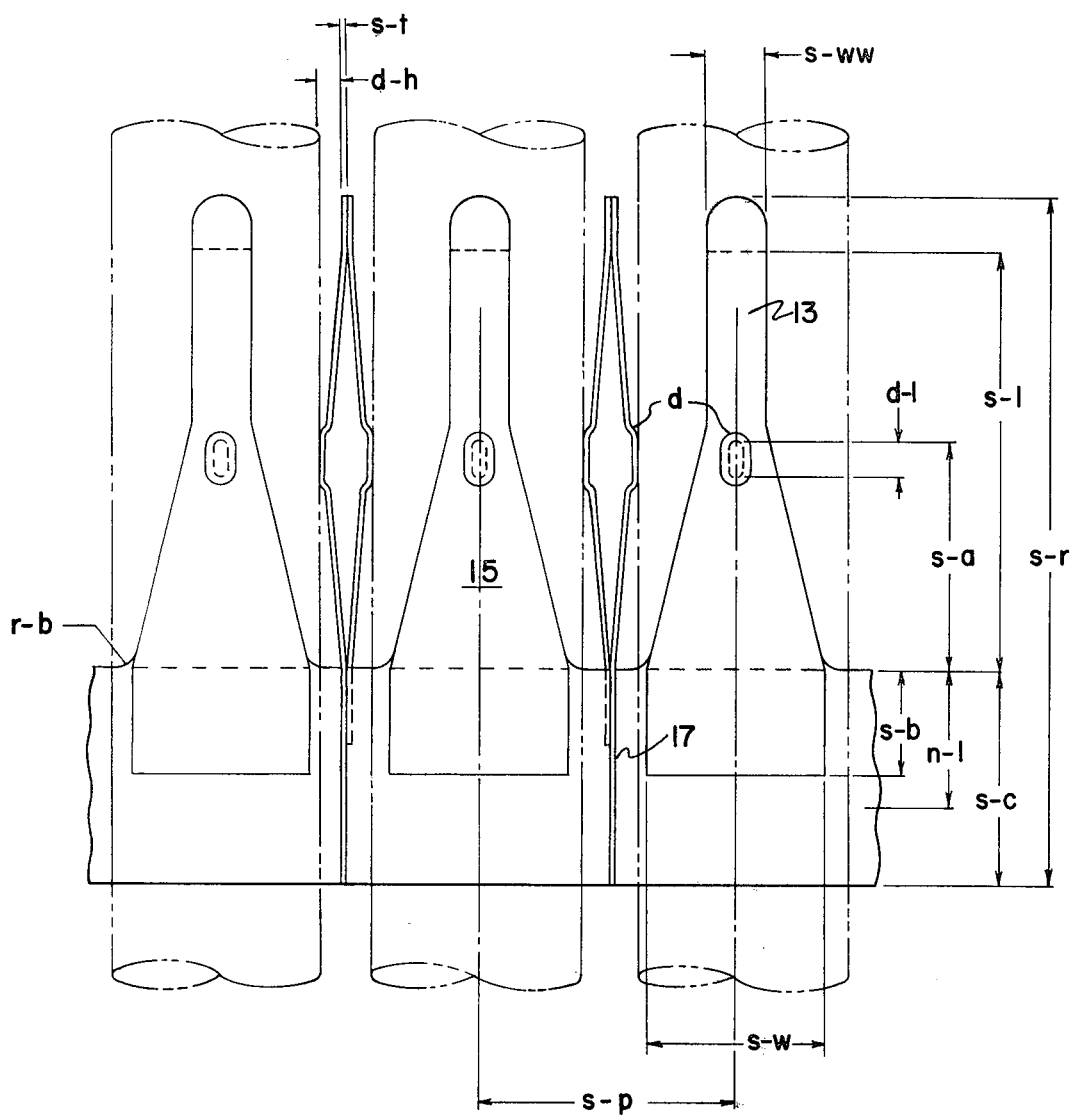
FIG. 6
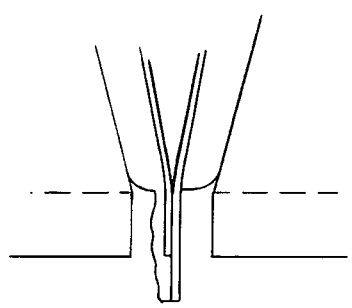
FIG. 7-A
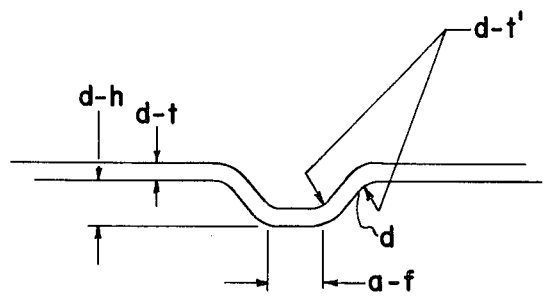
FIG. 7-B

REACTOR FUEL ASSEMBLIES

RELATED APPLICATION

This is a streamlined continuation of Ser. No. 125,544 filed Mar. 18, 1971 now abandoned.

BACKGROUND OF THE INVENTION

1. Field of the Invention

This invention related to nuclear reactor fuel assemblies; and in particular, to such an assembly which includes a plurality of elongate fuel rods arranged relatively equi-distant and parallel in a matrix (bundle), this orientation being maintained by a plurality of improved spacer grid means disposed at prescribed support plane zones intermediate along the bundle length.

In fuel assemblies which comprise a matrix of parallel fuel rods, the ends of the rods and a number of intermediate points must be fixed in space using spacer means, such means acting to maintain relatively constant separation along the rod lengths. During reactor operation, especially with a reactor whose rods are subjected to passage of an operative fluid (e.g. water coolant), the fuel rods are subject to vigorous and harmful vibration from a number of sources; hence their spacers must comprise relatively strong, stiff members. "Fretting" and similar abrasion of a rod cladding by the tangent spacer contact can typically result from excessive vibration of the rod relative to its spacers. To avoid this, resilient spacer contact means are employed. Such resilient spacer contacts (springs) may be mounted from adjacent portions of spacing strips according to the invention. In a preferred embodiment, these strips are arranged in two orthogonal sets, sometimes known as an "egg crate" design. It will be apparent that this strip matrix may define rectangular spacing cells enclosing respective fuel rods, with contact springs projected therefrom to resiliently establish the rod position within the cell. Known spacer constructions do not adequately meet the requirements of todays reactors and are quite unsatisfactory in certain respects (see below). The present invention is adapted to meet this need.

2. Prior Art Problems; Background

Fuel bundles as presently known in the art do not satisfactorily answer certain operational problems. One such problem involves fuel rod vibration; for instance as induced by high velocity fluid flow (along the rod length). Fuel bundle design presents an especially severe vibration problem because of the multitude of closely-spaced elongate fuel rods stacked in parallel, with their thin protective sheathing (e.g. of Zircaloy). For proper reactor performance and to avoid destructive rod-contact, the rod position and relative spacing must be very closely controlled (kept constant) statically, and also dynamically, that is, during the high velocity coolant flow and the other extreme, rapidly-changing reactor conditions (such as the high operating temperatures, the corrosive environment and the like). Without adequate internal support the fundamental frequency of such a long fuel rod is very low (on the order of one cycle per second). The diverse pressure components from passing fluid impressed on a rod are likely to be quite influential at such low (response) frequencies and can induce the rod to vibrate wildly unless adequate support is provided. Furthermore, an unsupported rod is so extremely flexible (limp) that relatively small excitations may induce vibrations of great amplitude — for instance, the excursions may be large enough to slap one rod against another, with, of course, catastrophic consequences for reactor operation. More importantly, even a small rod displacement can destroy the "critical geometry" condition which is so essential to proper safe reactor operation. The invention meets this problem by providing an improved safer rod spacer means and including contact springs (grid springs) whose spring characteristics are tailored to the rod stiffness and are set within a prescribed stiffness range: i.e. to be stiff enough to prevent relative motion of the rod, as well as to force a "near-node" on the rod under flow-induced vibration; yet to be resilient enough to accommodate rod dimensional changes such as axial expansion (as discussed below) without buckling the rod. Those skilled in this field will recognize that such a definition of grid spring characteristics is new in the art.

A second challenge is that a spacer support system must also be able to accommodate dimensional changes in the rods (axial and radial "growth" or shrinkage) such as may be caused by thermal expansion, creep, irradiation, pressure changes etc. as known in the arts. Thus, an adequate support system must accommodate such growth, while also providing support and stability under vibration. In particular, support springs must be able to follow rod motion (whether or not a "permanent set" is assumed) functioning so that any permanent set is small enough to preclude opening gaps beyond a prescribed maximum — since this could introduce rod-to-spring gaps, leading to fretting problems associated with spring impact, etc. The invention also meets this problem by providing this improved support system with contact springs of sufficient "elastic springback" to "follow" all such dimensional changes.

A third problem involves buckling of fuel rods due to excessive axial loading, typically caused by friction forces. For instance, thermal- or irradiation-induced elongation of a rod while it is gripped by its supports can compress the rods beyond their elastic limit whereupon they will buckle. Accordingly, an upper limit must be set on the support rod contact force so that the support (e.g., contact springs) will yield and allow rod axial motion before buckling pressure is attained. Moreover, such axial loading can also be imposed upon the support system itself; hence, the overall system must be specified for sufficient vertical strength to withstand axial thrusts on the grid. Also, with some (minor) vibrational displacement of a rod being inevitable, the overall support system must be designed to follow rod displacement however great, lest damaging impacts, fretting, etc., result. In other words, a grid spring must never "lose contact". The grid spring of the subject invention satisfies this requirement, being specified to exhibit elasticity over the maximum expected rod excursions induced by coolant-flow, vibration or other excitation such as in the course of handling and shipping.

Other problems in the support design may be contemplated by those in the art; such as minimizing hydraulic impedance (pressure drop) with anticipated coolant fluid flow and offering good neutron economy (low parasitic neutron absorption characteristics).

Accordingly and primarily to provide the mentioned improved spacer arrangement, a number of design features are taught herein being novel in themselves and/or in combination, and may be briefly summarized as follows in Table I.

TABLE I

1. Contact springs will be given a prescribed minimum "stiffness" (spring constant), sufficient to effectively eliminate all significant vibrational excursions of the rod — in sharp contrast to the conventional concept that a mere minimum "retaining force" must be maintained against the rod — bearing in mind that, unless the rod moves, no force at all is necessary according to the invention;
2. Contact springs will also be specified to have sufficient "elastic spring-back" (that is, operative deflection within elastic limits) so as to follow rod displacement without losing contact and thus with no consequent fretting; these being installed with sufficient "pre-set" to accommodate the maximum anticipated rod displacement.
2A. A maximum spring stiffness is also specified to prevent buckling (corresponding to a prescribed pre-set) pre-set being understood as the initial dimensional displacement of a contact pad from engagement with its rod; this pre-set being also arranged so as to clamp the rod sufficiently to prevent sliding and resultant friction;
3. The support system will be designed to present minimal hydraulic impedance to passing coolant fluid, especially that closely adjacent the rods; while yet enhancing a sufficient degree of coolant mixing.
4. The support system will be designed to offer a minimum mass;
5. The support system will have low parasitic absorption characteristics;
6. The support system will be comprised of relatively common, readily available materials and structural parts to minimize fabrication costs and associated problems as well as to minimize the mass and volume;
7. The support system will be specified of sufficient vertical strength so as not to be distorted or weakened by rod growth in the axial direction;
8. The fuel bundle will be provided with a sufficient number of support arrangements (grids) along its length to adequately increase its fundamental frequency response and stiffness of the rod.

In general, features of the described invention provides the foregoing advantages and features in a "resilient/resilient" or "paired-bow" type spacer system for a reactor fuel bundle wherein the stiffness $K_m$ of the spacer system is specified (in range) such as to accommodate a prescribed maximum rod deflection (minimum pre-set distance operating in the elastic range of the support members). More particularly, the novel support system, including resilient/resilient contact springs is specified to be sufficiently resilient (low stiffness) so as to accommodate rod growth without buckling and so as to accommodate the effect of irradiation enhanced rod relaxation; while yet being stiff enough (minimum stiffness or spring constant) so as to provide a near-node under prescribed maximum vibration conditions without significant rod deflection, loss of support-rod contact or the like. In addition, the novel support is also designed and specified so as to operate entirely within its elastic range over maximum expected (rod) displacement (e.g., over about 15 mils excursion for the preferred embodiment) and without a set being induced in any contact spring (that is, short of the elastic spring back limit). The embodiments described below provide some or all the aforementioned features and advantages in support systems taking the form of an egg crate frame from which are projected contact springs having the specified characteristics and in a preferred "back-to-back", "paired-bow" spring configuration. This "paired-bow" will be observed to present a minimum impedance to the fluid flow while imparting significant mixing as well as presenting a maximum contact area with the rod (thus, lower contact pressure and less wear), as well as a relatively constant contact area, unlike similar prior art spring configurations which offer a relatively small contact area. As further explained below, this novel spring arrangement will also be seen to present a relatively uniform stressdistribution along its length, with no areas of high stress or stress discontinuities, as opposed to prior art springs such as described in U.S. Pat. Nos. 3,350,275 (item R) and 3,380,890. In addition, it will be seen that the new spring configuration presents a number of functional advantages, such as symmetrical compliance (in the direction or rod displacement); separate/couple compliance (that is, each spring in the pair may be flexed separately, or they may be flexed together as a unit), and structural "redundancy", whereby the paired springs are preferably secured to their support base at a plurality of points — thus minimizing the chance of breakage and dislodgement of a spring piece, with the well-known damaging effects upon reactor operation. This configuration may be optimized by providing contact pads of reduced hydraulic cross-section.

SUMMARY

The preferred features of the taught embodiments and other mechanical properties of each support system may be summed up as follows. System stiffness will be specified between a prescribed minimum (e.g. minimum stiffness necessary to damp out vibration motion of rod) and a prescribed maximum (e.g. maximum stiffness tolerable under expected axial rod forces without buckling); such as between about 0.3 and about 0.6 pounds/mil for described embodiments. This minimum stiffness will be that sufficient to force a near-node in the rod at the spring contact under flow vibration (preferably about 5 times the rod stiffness midway between support loci), and together with the preset displacement to prevent sliding abrasion there. That is, abrasion is discouraged by providing sufficient spring contact force which, together with frictional drag, will eliminate sliding under vibrational amplitude possible in the system. However, the minimum load tending to buckle the rod must be more than the resulting maximum contact force (axial, frictional component of the product of spring stiffness and expected contact pad displacement — cf. resolved by the applicable coefficient of friction).

Those skilled in this art will appreciate the distinctiveness of this design; for instance, as opposed to other spring systems which, contrariwise, tend to force a positive node through the use of rigid contact dimples, or the like. Such expedients are not, of course, absolutely "rigid"; nevertheless, they are not specified in elastic characteristics matched to those of the rod, and they are not resilient enough, nor have they enough elastic spring-back, to maintain rod contact at all times. We have found that when a reactor rod under vibrational stress is properly contacted by resilient spacers on opposing sides, and when such resilient supports are substantially stiffer than the rod at that point a node, or point of zero vibration displacement in the rod, may be approached at the contact point, thus effectively dividing the rod into multi-supported spans, each span vibrating with a frequency higher than that of the unsupported rod (by the square of the number of spans) and increasing the effective-stiffness and resistance to vibration of the rod.

The system will also be designed so that the induced axial loads on a rod will be greater than the maximum expected frictional contact loading at the contact point (under operating reactor temperatures) and will also be less than the load limit of the material as modified to reflect irradiation-induced creep and relaxation. For example, in one embodiment wherein 10 foot Zircaloy rods spaced by seven support systems are prescribed according to the invention, it was found that the frictional contact load was on the order of several pounds [product of assumed spring constant of 0.45, maximum displacement of .15 mils, and coefficient of friction of 0.5] and that this was less than the rod-buckling load. The frictional contact-loading on the rod is small enough so that the rods can expand normally. It will be apparent, so that the rods can expand normally especially in view of the example summarized above, that the support system must be defined according to the invention within mechanical limits that are much better defined than heretofore.

LIST OF FIGURES

Embodiments of the invention will now be described by way of example with reference to the accompanying drawings, in which:

FIG. 1A is a cross-sectional view of a fuel bundle illustrative of a preferred embodiment of the support spacer invention;

FIG. 1B is an enlargement of a portion of FIG. 1A;

FIG. 6 is a fragmentary side elevation after the manner of FIG. 4, indicating associated spring members with related strip members and with associated transverse strips, all comprising an alternate embodiment to that in FIG. 4;

FIG. 7A is an enlarged showing of a portion of FIG. 6;

FIG. 7B is an enlarged fragmentary section of a contact pad portion of a spring embodiment of FIG. 6;

DESCRIPTION OF THE PREFERRED EMBODIMENT

In the following description and associated drawings of spacer grid support assemblies, the devices will be understood as especially adapted for a nuclear reactor fuel assembly which is of the "canless" type, intended for employment with other similar assemblies to comprise the core of a PWR (pressurized light water reactor). However, in an alternate embodiment the foregoing grid concepts according to the invention will also be found adaptable to a BWR (boiling water reactor) design. This interchangeability of design concepts is quite unique in the art and is extremely valuable, as experts will readily attest. Thus, it should be appreciated that the grid design concepts according to the invention are not only unique and novel in themselves, but are uniquely interchangeable between BWR and PWR reactors. Practically speaking, there is no competing support design which can make this claim!

Figure 2:
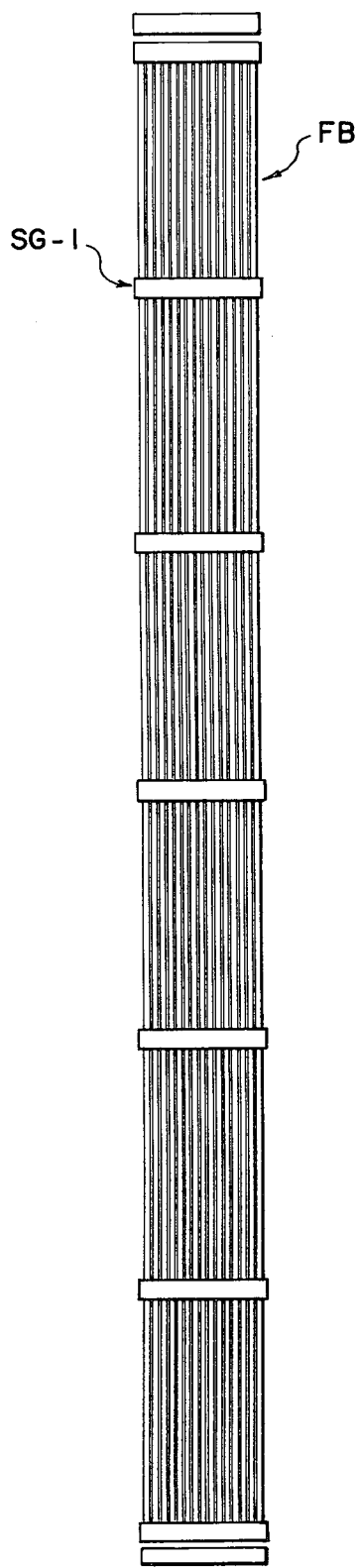
FIG. 2 is a very schematic elevation of the bundle in FIG. 1.
Figure 8:
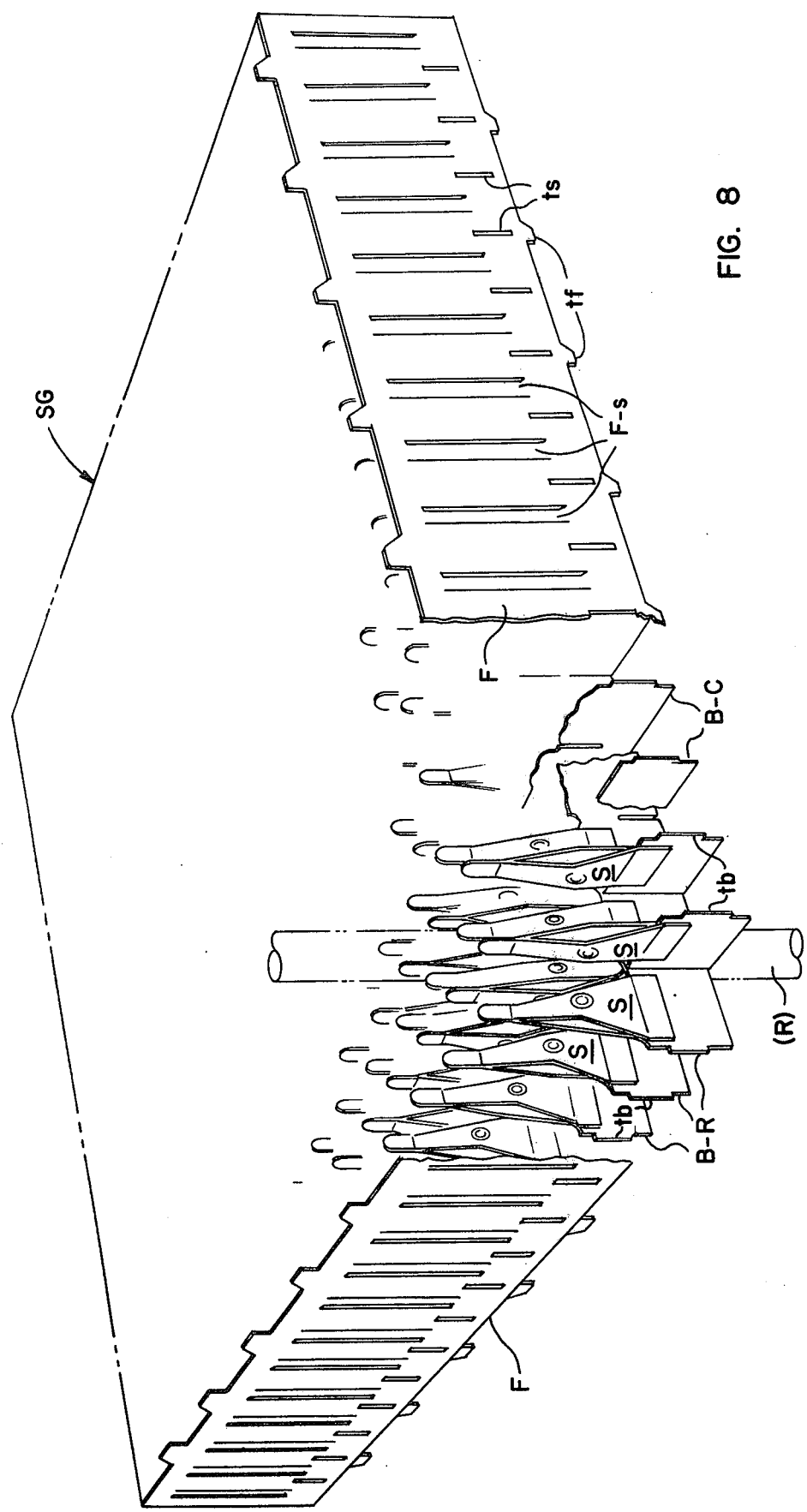
FIG. 8 is an upper perspective simplified view, only partly completed, for clarity, of the support system of FIGS. 6 and 7.

The fuel bundle will be understood as employing fuel rods arranged parallel to one another in a rod matrix, each rod being of full core height and consisting of a stack of pellets of ceramic or like fissile material enclosing in a suitable metallic cladding such as a zirconium alloy. In FIGS. 1, 2 and 8 of the drawings, a spacer grid SG (illustrative of seven such for the entire bundle as indicated in FIG. 2) is shown according to the invention. Grid SG will be understood as maintaining a bundle of fuel rods R in correct lateral position, there being also provided upper and lower end fittings as known in the art. Grid SG has a generally square outer frame F fabricated from four plates of boundary straps, welded together at the corners, as best seen in FIG. 1. Although only a few rods are shown in FIGS. 1A and 1B, it will be understood that they are disposed in the aforementioned (15 × 15) matrix. The frame members comprise strips of Inconel of the like presented "edge-on" to fluid flow. Frame F has a length L and width W enclosing the egg crate for this matrix of index points (rod center points enclosed by length L' with W'). The pitch P-R, P-C in FIG. 3 for the rows and columns respectively is the same, 0.563 inches in the PWR embodiment (for rods R, here, 0.422 inches diameter). Frame F carries a plurality of equal width support strips B arranged in orthogonal rows ($r$) and columns ($c$) as row strips B-R and column strips B-C. As indicated schematically at the crossing points (FIG. 8), each strip is slotted through one-half its (respective upper or lower) width so as to be mated and intermeshed to intersect along a common plane in the known egg crate manner, being secured together there by furnace brazing. Such slotting is indicated as notches $n$ provided at index (crossover) points of the strips B, being cut into the bases for strips B-R and the upper edges for orthogonal strips B-C. These notches n will naturally be sufficiently wide, N-W, to accommodate the strip width. The ends of strips B include tab portions tb adapted for insertion into slots in Frame F so as to be flush therewith and are furnace brazed thereto. Like members of Frame F, strips B are Inconel oriented edge-on to the reactor fluid flow.

Figure 4:
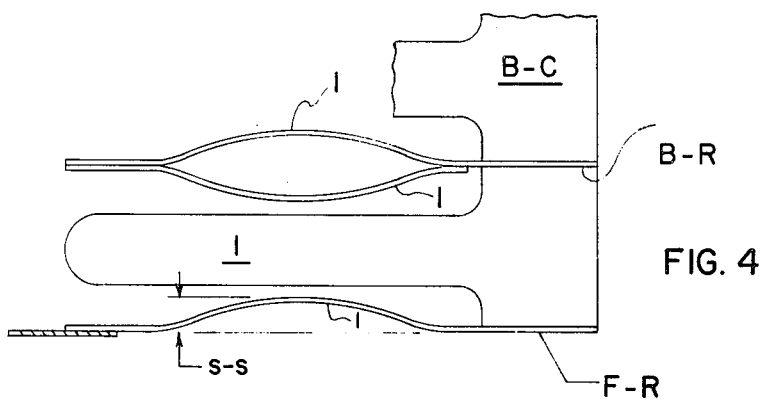
FIG. 4 is a portion of a vertical sectional view through a simplified grid, being exaggerated for clarity to indicate the character of the contact springs, etc. in the support system shown.
Figure 3:
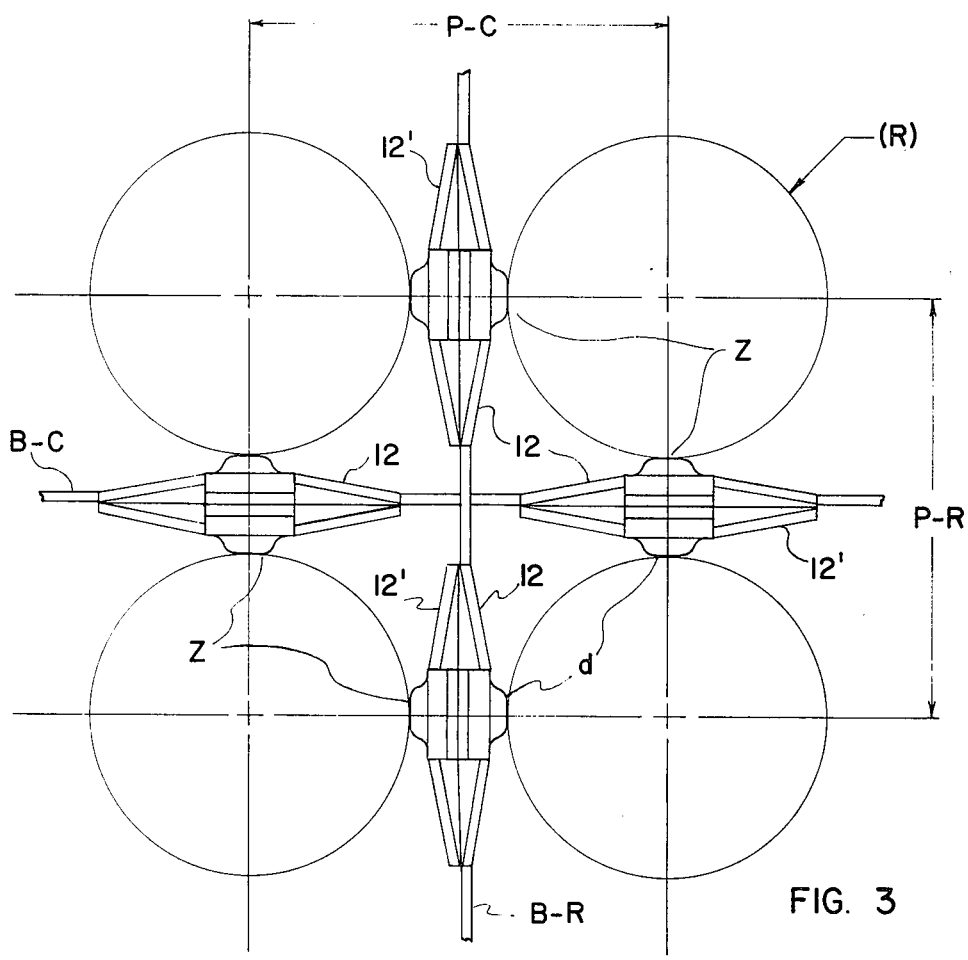
FIG. 3 is an enlarged fragmentary view of FIG. 1.
Figure 5:
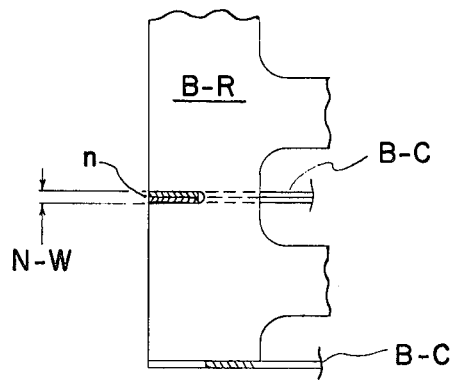
FIG. 5 is a fragmentary elevation of part of a support strip embodiment for use with the foregoing embodiment.

As seen more particularly in FIGS. 3 and 6 and especially FIGS. 1 and 8, each strip B comprises a beam spanning the appropriate grid dimension and including integral spring finger projections S arranged at appropriate index points A therealong. (Alternate form of springs S' in FIGS. 4 and 10. For instance, row strip B-R in FIG. 6 includes fingers 1 and notches n arranged therealong to span a particular grid row r in the grid SG. Fingers 1 have an overall height S-R of about 1.5 inches, a pitch S-P of about 0.56 inches and a length SB-L of less than an inch each finger 1 being about 1.0 inches projecting length. As shown in FIG. 4, it appears that these alternate springs S' are preferably bi-part including a primary finger 1 affixed integral with its strip B, each finger 1 being welded "back-to-back" to a companion secondary finger 1'.

Although any given set of rows or columns requires separate complementary fingers 1' and these are not intended to be stamped out on a single strip as are fingers 1 — though such could be the case. Complementary fingers 1' are welded in dynamic pre-bent relation with respective primary fingers 1 as indicated in FIG. 4, each of the paired, welded fingers having roughly the same bent shape and dimensions (e.g. free height of bend S-S of less than 0.1 inch.) However, only the primary fingers are preferably stamped out integrally with the respective base strip B. Spring material, especially suitable for this environment and its constraints is a nickel alloy having the superior high temperature spring properties Inconel No. 718 (or equivalent alloys). A perspective showing of a similar grid S-G including representative alternate spring Z and cross strips B-R/B-C is shown in FIG. 3, being fragmented and greatly simplified for clarity.

It will be apparent to those skilled in the art that, although the springs in this embodiment point upward, this orientation could be reversed with the springs pointing downward, enabling the addition of mixing vanes extending upward from the cross strips B-R/B-C.

ALTERNATE SPRING EMBODIMENT

FIGS. 3, 6, 7 and 8 show an alternate form of contact springs Z (to springs S' aforedescribed FIGS. 4 and 10) wherein the springs are, generally speaking, the same as before except for a "flared-base" construction together with a "contact pad" provided for reduced flow impedance. This alternate spring construction may be preferable in some applications. FIG. 3 shows in plan view, four such associated springs Z arranged in adjacent operative relation with associated fuel rods R. Springs Z generally comprise back-to-back joined pairs of cantilever spring fingers as before, two pairs being indicated as projecting from respective index positions of columnar strip B-C and and two other pairs being similarly projected from adjacent row strip B-R. Each spring Z comprises a primary finger 12 projecting from (and preferably stamped-out integral with) its associated strip B and having welded to it, at its inter and outer ends a companion secondary finger 12'. For welding, the paired springs are pre-bent symmetrically as prescribed and generally arranged as to function (as before) as resilient positioning contacts with opposed rod sections, these contacts being specified and comprised to exhibit the same general properties as for analogous springs SS' aforedescribed.

It will be evident that the foregoing "flared-base" spring finger configuration is somewhat more stable and economical of materials as well as being somewhat stronger, for instance, to better resist the frictional and other forces along the rod axis. The width S-WW of the fingers will be specified in accordance with the circumferential curvature of rod R (against which its contact pad D must bear). The maximum flared width of base portions of the fingers will be adjusted such as to obtain appropriate spring constants while leaving a suitable gap between adjacent bases (for notches n) and should taper from the vicinity of the pad (outermost contact surface thereof). The thickness S-T of the spring fingers (and, here, that of integral strip B) will also be selected to provide the specified stiffness value in light of the other specified constraints such as preset, maximum displacement, maximum contact force, etc.

Figure 9:
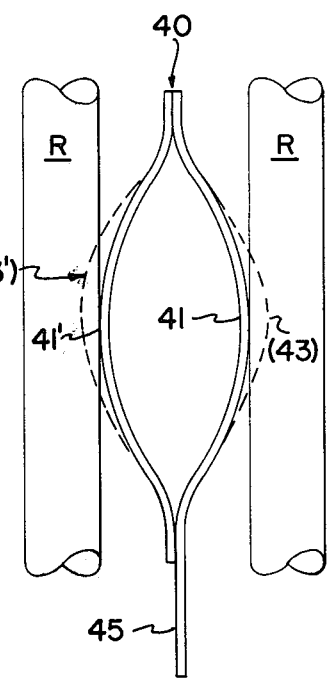
FIG. 9 is a side elevation of a grid strip suitable for use with the present embodiments in FIG. 1.

It will be evident that contact-pad portions D may be dispensed with where one is unconcerned over reduced contact cross-section for hydraulic efficiency and minimum downstream stagnation. However, this shape will usually be desired and will be seen as relatively simple to implement, especially for strip-finger sections which are to be pre-fabricated and stamped-out as a unit (FIGS. 6 and 9). The contact area D-L, D-F of pad D will be prescribed in accord with considerations for appropriate distribution of Hertzian stresses and heat transfer.

DESIGN FEATURES

Figure 10:
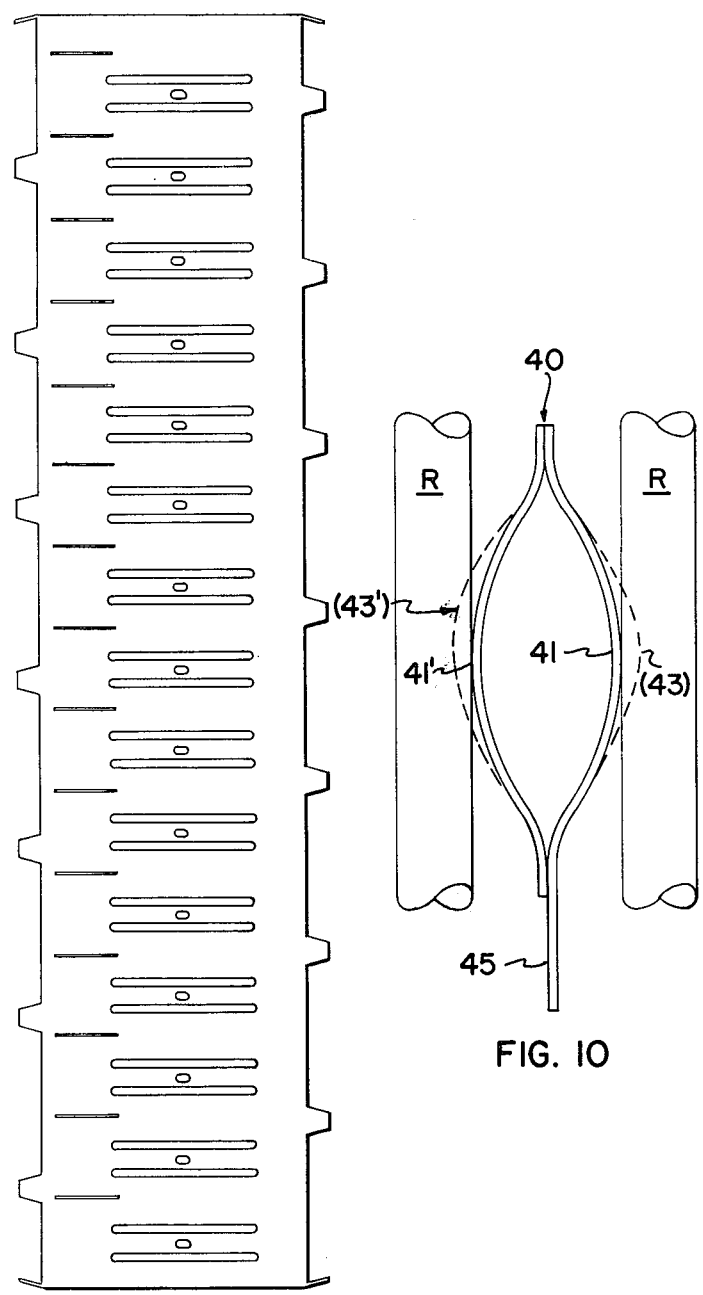
FIG. 10 is an enlarged, highly schematized view of an idealized spacer spring after the present embodiments shown in operative conjunction with a fuel rod.

Referring especially to FIG. 10 and with reference to all of the aforementioned embodiments, the design features (e.g. stiffness) of spacer springs according to the invention will now be discussed. FIG. 10 shows, very schematically and for discussion purposes only, an exemplary contact spring 40 after the embodiment of FIGS. 4, 6 and 9, and comprising a pair of back-to-back spring fingers 41, 41' welded together at their projecting ends and otherwise arranged as described above. Primary finger 41 is integral with and projects from a basal strip 45 as before. Spring 40 will be understood as shown, very schematically only, in its typical "in situ", operative condition wherein both finger halves 41, 41' are in a "cocked" (or compressed) condition, being inserted between respective fuel rods R and resiliently pressing thereagainst (in combination with companion spring fingers on opposite rod surfaces — such being understood as operative, though not indicated here). It will be understood that the removal of a rod R will allow the relaxation and "uncompressing" of a spring finger, for instance as indicated in phantom along relaxation locus 43 for finger 41 and 43' for 41'.

The spring constant K, or stiffness, of the support system has been described and alluded to as an important feature of the invention. It has been generally indicated that it was found according to the invention that this stiffness K should be: as a Minimum-at least-sufficient to prevent any significant expected vibrational excursions of the rods. Referring to FIG. 10 especially, it will be understood that this means that one or all surfaces of rod R at the particular contact elevation should be maintained in constant position during such vibration. The surface of rod R which is tangent to plane V—V will be understood as being kept relatively immobile by contact finger 41 and its associated springs (on the opposite rod surface and along other axial sections of the rod R as aforedescribed). Such fuel rods are typically far too flexible to maintain adequate spacing and alignment, while supported over large lengths — being prone to change their "spacing" (inter-rod gap) and even to slap against an adjacent rod under the influence of vigorous high velocity flow and other reactor operating conditions. The unsupported fundamental natural frequency of a typical fuel rod R with stainless steel cladding is approximately 1 cps in air and its stiffness is only 0.3 lb/in. If the support system forces a near-node (near zero displacement) where it contacts the rod, then the fundamental natural frequency and the stiffness are both increased greatly. For rods R indicated FIG. 2, providing the five internal supports grid SG will increase the fundamental natural frequency 36 times and the stiffness 216 times.

Because the clearance between rods R is typically so very small, (order of 0.140 in.) one should not expect the support system to force an "absolute" node (no displacement at all) at the point of contact without requiring a very large spring constant (and the heavy material associated therewith) and causing a prohibitively large pressure drop across the supports. To minimize the required stiffness it is important to know how stiff the support system must be to force enough of a node at the point of contact so as to retain most of the advantage of inserting the internal support. The necessary support stiffness can be determined by considering the simple-support vibration of the rods. If the supports were rigid, their fundamental natural frequency $w_o$ would be the simple support frequency of the span between supports (e.g. grids SG) — found to be:

$$w_o = \sqrt{K_r/M_e} \tag{1}$$

where:

$K_r$ is simple support stiffness of span $M_e$ is effective mass

The supports are not rigid, but have some stiffness $K_s$. A lumped singledegree-of-freedom model for one span of the rod vibrating on stiff supports is contemplated and will have a natural frequency $w$. Only half the stiffness of each support is used because one support acts on two spans. As long as the motion at the supports is small compared to the mid-span motion of the rod, the effective mass for this mode of vibration will be the same as for rigid supports. The natural frequency of the lumped model of one span on stiff supports is $$w = \frac{K_r}{M_e\left(1 + \frac{K_r}{2K_s}\right)} \tag{2}$$

The ratio of natural frequencies is then $$\frac{w}{w} = \frac{1}{1 + \frac{K_r}{2K_s}} \tag{3}$$

This ratio should not be less than RR (e.g. unity). Therefore, the support should be at least T times as stiff as the simple-support stiffness of the rod between supports, i.e., $$K_{ks} \geq TK_r \tag{4}$$

Two types of rods, both having an outside diameter of 0.422 in., are contemplated; namely, a first rod R-I having steel tubing, $E = 29 \times 10^6$ psi, with 16.5 mil wall thickness and a second rod R-II having Zircaloy tubing, $E = 11 \times 10^6$ psi, with 24 mil wall thickness.

For a 20-inch span of the stainless steel tubing R-I:

$K_r$ 32 75.3 lb/inch

For a 20-inch span of the Zircaloy tubing R-II:

$K_r = 40.8$ lb/inch

If the support system is to be stiff enough for both types of fuel rods, $K_s > T(75.3)$ lb/inch

BUCKLING OF FUEL RODS BY FRICTION

Because of the effects of temperature changes and irradiation, the support system must permit relative axial motion between the rods and the support system. This axial motion induces a drag force which is a function of the normal force and the coefficient of friction. These forces exist at each point of contact between the support system and the rod and can result in an axial compressive load tending to buckle the rod.

The buckling load will depend on the number of sections the rod is divided into by the support system. If the rod is assumed to buckle in the simply supported mode, then the Euler buckling load is $$P = \frac{\pi^2 EI}{(L/N)^2} \tag{5}$$

Where L is the total length of the rod and N is the number of spans.

The friction load that must be supported by the span carrying the largest load, is $$F = 4\mu NF_s \tag{6}$$

where $\mu$ is the coefficient of friction and $F_s$ is the spring force at each point of contact between the rod and the support system. This friction load should not exceed the buckling load. Therefore, $$F_s \leq \frac{\pi^2 EI/(L/N)^2}{4\mu N} \tag{7}$$

based upon elastic behavior of the rod. However, to account for irradiationinduced rod growth, rod creep and support system stress-relaxation, the effective load is conservatively increased by a factor K as a "plastic creep allowance:"

$$F_s \leq \frac{\pi^2 EI/(L/N)^2}{K'\mu N} \tag{8}$$

$$K' = 4(1 + K)$$

The spring force $F_s$ is determined by the support system stiffness $K_s$ and the preset $D_o$, i.e., $$F_s = K_s D_o \tag{9}$$

For a given preset, the resulting buckling load limits the support stiffness:

$$K_s \frac{\pi^2 EI/(L/N)^2}{K'N\mu D_o}$$

Strictly by way of hypothetical example only, one could assume that a ten-foot Zircaloy fuel rod is divided into six equal spand and, conservatively, assume a coefficient of friction of 0.5. Here, the maximum allowable contact force is:

$F_s$ , 9.0 lbs.

and the corresponding limiting spring constant LSC would be on the order of less than 1 pound per mil.

If, for the Zircaloy fuel rods, a minimum support system stiffness MSS is assumed as required for a near-node in vibration, the support system would have to be designed to rather narrow limits of spring stiffness, i.e., LSC lb/mil  $K_s$  MSS lb/mil Or, if the same spring were to be used for both stainless steel and Zircaloy rods, the stiffness would be limited to an even narrower range.

The upper limit would be conservatively selected, due to choice of friction factor and choice of buckling load model (cf. the "simply supported" mode). Because of friction, the support system applies a restraining moment to the rod which tends to clamp the rod at the supports. The buckling load in the clampedclamped mode is four times that in the simple-support mode. However, the support springs have some flexibility, so they are not true simple supports. This tends to lower the buckling load somewhat, although the real bucklihg load under these conditions will actually be a factor several fold greater than the simply supported mode would dictate. For instance, it has been observed that springs according to the invention can readily withstand sudden forces of 6 to 8 G, without significant degradation. Such springs have remained undamaged in the face of forces sufficient to smash the "honeycomb matrix". Such a unique "spring-protection" capability is of novel instance in this art. Further, the high spring-back capability of this system amplifies the foregoing advantages.

The foregoing operational advantages will be recognized as very useful, especially in instances where the reactor is subjected to extreme stresses; for instance, under an action of accelerated seismic forces (which can present as much as 4 to 6 G. loading). Another instance for useful application is during a coolant "blow-down", where as a result of an accidental rupture of the reactor's cooling system (an admittedly extreme case) a blow-down can occur whereby the coolant fluid "erupts" from the core, with violent impact on the rods. The subject paired-bow spring system has a much better chance of surviving such a blow-down incident intact; whereas prior art springs with their highstress concentrations and discontinuities can be expected to collapse, permanently deform, or otherwise become disfunctional. A further and related advantage is that where prior art spring systems are so coupled between rods as to transfer and accumulate stresses across the core cross-section, the subject paired-bow spring system is much less likely to do so, offering better isolation and more independent spring action.

Springs according to the foregoing embodiments are preferably comprised of Inconel or a like nickle-iron-chromium spring alloy, mostly because of its high corrosion-resistances and high-yield strength in a reactor environment; however, in certain instances, one might substitute a Zirconium alloy to take advantage of its lower neutron cross-section.

It will be evident to those skilled in the art that a "resilient/resilient", or "paired-bow", spacer system such as those described above may be modified to provide at least some of the recited capabilities and/or that it may be tailored to different (though analogous) reactor grid environments. Thus, the present invention may be embodied in other specific forms without departing from the spirit or essential attributes thereof and, accordingly, reference should be made to t: appended claims rather than to the foregoing specifications as indicating the scope of the invention.

What is claimed is:

1. In a nuclear reactor fuel array, improved means comprising:

a plurality of parallel nuclear fuel rods;

a plurality of grid spacers axially spaced along the length of said fuel rods;

column support strips and row support strips associated to define a plurality of square openings orthagonally and egg-crate arranged within each grid spacer, the corresponding square openings of the axially spaced grid spacers defining for each fuel rod a longitudinal predominantly open compartment having a square cross section, said openings consisting of a few peripheral openings around the periphery of the grid support and many non-peripheral openings, there being many non-peripheral compartments and a few peripheral compartments;

four fingers integrally extending from a set of four edges of each of said non-peripheral square opening, such fingers extending in directions approximately parallel to the fuel rods extending through said non-peripheral square openings;

a bowed portion at a cantilevered end portion of each of said fingers, said bowed portion extending into a compartment;

a bowed finger portion welded back-to-back at its ends to the bowed portion of said integral finger cantilevered from a support strip, said bowed finger extending into a compartment adjacent to the compartment receiving said bowed portion of the finger, each fuel rod in one of said non-peripheral compartments being resiliently contacted by halves of four paired-bow springs thus extending into said compartment for said fuel rod, and each of the non-peripheral paired-bow springs resiliently contacting fuel rods in two adjacent compartments, said grid spacers providing each of said rods only with resilient supporting contacts, the paired-bow springs being constructed and arranged to permit both radial expansion and axial expansion of each of said rods and to permit convenient axial insertion and removal of each of said rods.

2. A nuclear fuel bundle having the combination of:

a plurality of parallel fuel rods;

a plurality of grid spacers axially spaced along the length of said fuel rods;

column support strips and row support strips within each grid spacer, each fuel rod being within a predominantly open compartment having a square cross section, such compartment being defined by corresponding square openings in each grid spacer, each grid spacer having orthagonally and egg-crate arranged square openings defined by said support strips, a few of said compartments and openings being around the periphery of the bundle and many of said compartments and openings being non-peripheral;

four fingers integrally extending from a set of four edges of each of said non-peripheral square opening, such fingers extending in directions approximately parallel to the fuel rods;

a bowed portion at a cantilevered end portion of each finger, such bowed portion extending into its compartment;

a bowed finger portion welded back to back at its ends to the bowed portion of said intergral finger, thereby defining a paired-bow spring cantilevered from a support strip, the bowed finger portion extending into a compartment adjacent the compartment receiving said bowed portion at an end portion of a finger, each fuel rod in one of said non-peripheral compartments being resiliently contacted by halves of four paired-bow springs extending into said compartment for said fuel rod; and each non-peripheral paired-bow spring resiliently contacting fuel rods in two adjacent compartments, said grid spacers providing a resilient/resilient contact spring arrangement for positioning and exclusively supporting said fuel rods each rod being contacted by and resiliently supported only by a set of two pairs of paired-bow spacer springs, said springs being cantilevered out from said support strips of said grid frames and being so constructed and arranged as thereby to permit radial expansion, axial expansion and convenient axial insertion of said rods.

3. An improved array of generally parallel nuclear fuel rods held within a plurality of axially-spaced grid supports, each fuel rod being resiliently coupled to each grid support only by a set of four grid springs, said springs being arranged in orthagonally arranged sets of mutually-opposed springs as a resilient contact system without employment of any rigid contacts and so as to provide independent spring action, absorbing a significant portion of any stress, each spring comprising a relatively smooth, continuous "bow segment", cantilevered out from orthagonally arranged support strips in one of said grid supports being adapted and formed to present and develop a uniform distribution of stress with substantially no stress discontinuities therealong, the spring being substantially stiffer than the rod while exhibiting significant elastic springback to accommodate a prescribed maximum rod excursion, and the set of grid springs imposing insignificant hydraulic impedance to circulating liquids, each of the four springs comprising the combination of a bowed-finger portion welded back to back at its ends to a bowed-portion of an integral finger cantilevered from a support strip, such cantilevered finger being approximately parallel to and approximately halfway between two nuclear fuel rods so that a non-peripheral paired-bow spring normally participates in the resilient support of two fuel rods but provides effective resilient support even when only one of its two adjacent compartments has a fuel rod.

4. The combination as recited in claim 3 wherein the contact force between spring and rod is sufficient to maintain rod position while yet sufficiently resilient to permit insertion and handling of the rod, each said spring having a prescribed minimum stiffness provided to effectively eliminate all harmful vibrations of the rod in service, each spring also having a prescribed maximum stiffness adapted to prevent buckling, plus a prescribed pre-set and a prescribed elastic springback to follow rod displacement allowing for this pre-set.

5. The combination as recited in claim 3 wherein each inter-rod spring is arranged and paired in back-to-back relation with an adjacent spring to describe a paired-bow configuration whereby each spring pair exhibits symmetrical compliance, separate and conjunctive resilience, and structural redundancy.

6. The combination as recited in claim 5 wherein said springs are sufficiently resilient to both accommodate growth and expansion of the rod without buckling the support system and also to accommodate irradiation induced effects whereby the entire support system operates wholly within its elastic range throughout all comtemplated rod displacements without any permanent "set" being induced in the springs.

7. In a nuclear fuel bundle comprising an egg crate frame and a plurality of axially spaced grid spacers positioning a plurality of parallel nuclear fuel rods in an orthagonally arranged grid, and improved grid spacer comprising:

orthaganolly disposed support strips defining a plurality of square openings, at least some of said openings being adapted to accommodate a round fuel rod;

a set of fingers cantilevered from and integral with the support strips, said fingers extending from the midpoints of the openings, the portion of a finger extending from a support strip to a bowed portion being approximately paralled to the fuel rods;

a pair of bow springs, each pair of bow springs being constructed of the combination of a bowed finger spring and a bowed portion of the integral finger to provide a pair of fingers, said pair of fingers being welded together back to back at their contiguous zones;

said springs, prior to the intersection of any rods providing orthagonally oriented sets of opposed springs resiliently extending toward the scheduled axis of a rod to provide an interspring distance less than the rod diameter;

said sets of opposed springs, after the insertion of a plurality of rods, being compressed to grip each inserted rod at four orthagonally spaced zones;

said gripping of said inserted rod by the four springs per grid being secure enough to permit transportation of the bundle with only spring gripping positioning of the rods and to withstand normal usage of the bundle, said inserted rod being supported in said grid without contact with a fixed support; and the gripping of said inserted rod by the four springs being resilient enough to permit axial expansion of the rod, to permit radial expansion of the rod, and to permit convenient insertion and removal of the rods.

* * * * *